Figure 1:
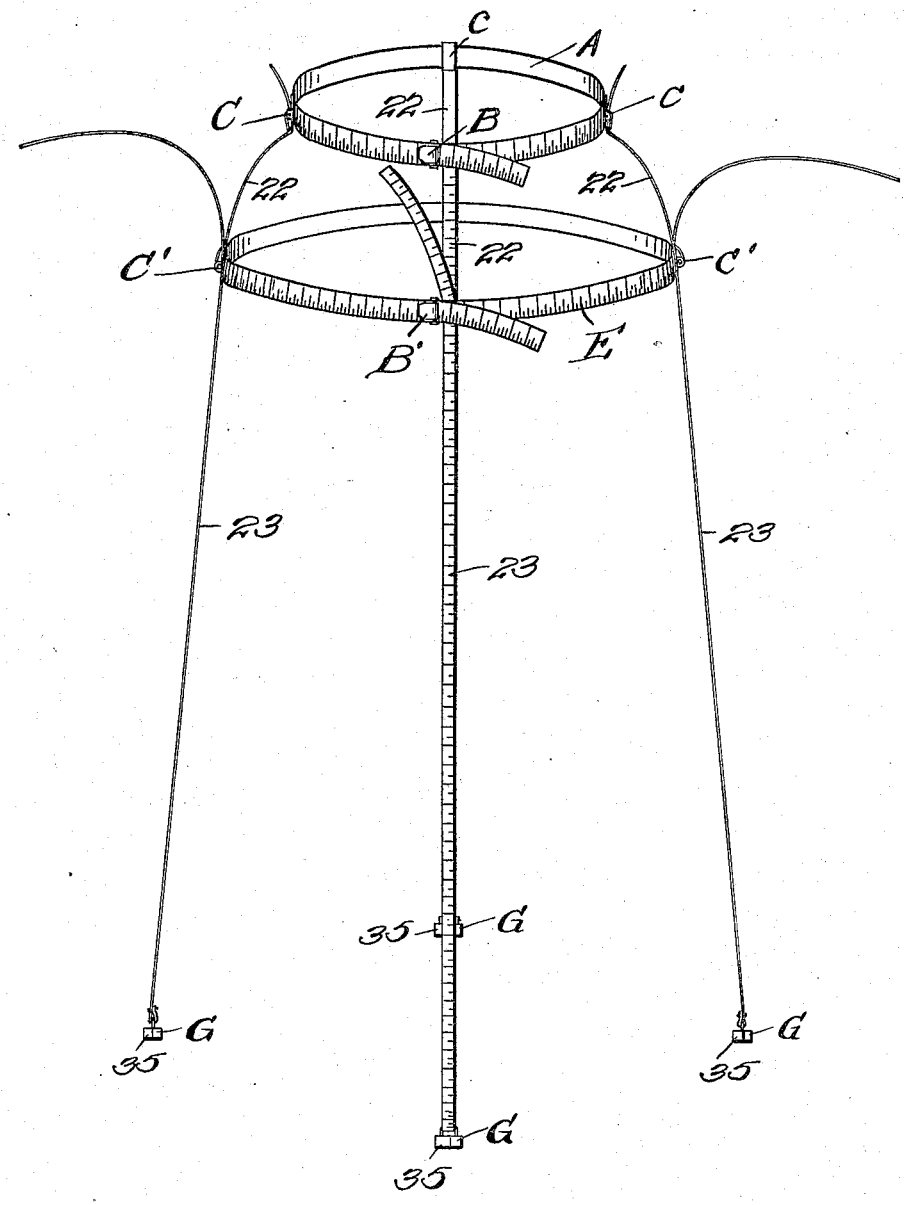

M. E. MORRISON.
SKIRT MEASURER.
APPLICATION FILED FEB. 8, 1909.

942,338.

Patented Dec. 7, 1909.
2 SHEETS—SHEET 1.

Witnesses

Inventor
M. E. Morrison
By Woodward & Chandler
Attorneys

M. E. MORRISON.
SKIRT MEASURER.
APPLICATION FILED FEB. 8, 1909.
942,338.
Patented Dec. 7, 1909.
2 SHEETS—SHEET 2.
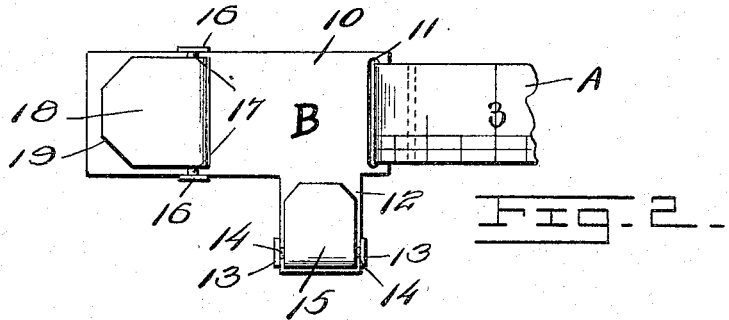
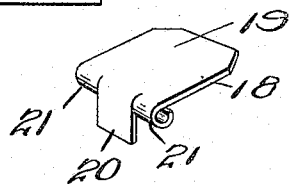
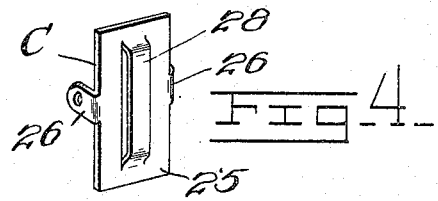
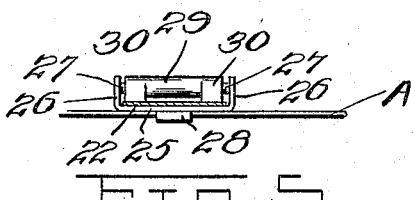
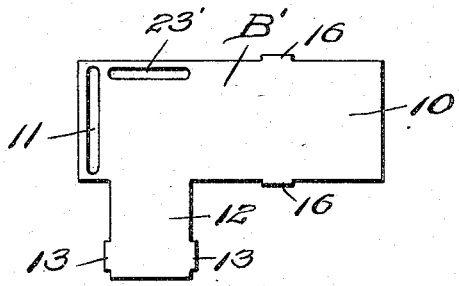
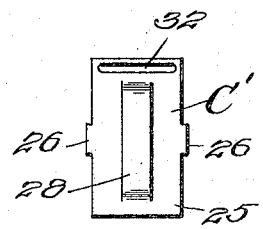
Witnesses
Inventor
M. E. Morrison
By Woodward & Chandler
Attorneys

UNITED STATES PATENT OFFICE.

MARGARET E. MORRISON, OF BARTLEY, NEBRASKA.

SKIRT-MEASURER.

942,338.  Specification of Letters Patent.  Patented Dec. 7, 1909.

Application filed February 8, 1909. Serial No. 476,673.

*To all whom it may concern:*

Be it known that I, MARGARET E. MORRISON, a citizen of the United States, residing at Bartley, in the county of Redwillow and State of Nebraska, have invented certain new and useful Improvements in Skirt-Measures, of which the following is a specification.

This invention relates to tailors' measures, and more particularly to a device for measuring dress skirts, and has for its object to provide a measure adjustable in the large variety of ways to meet the needs of dressmakers.

A further object of the invention is to provide a novel means for measuring the distance between the waist line and the broadest point of the hip, in order that the proper extent for the gore may be determined.

An important object of the invention is to provide a novel form of buckle and tape holder combined.

Another object is to provide a novel form of clamp for coöperation with the tape of the measure.

Other objects and advantages will be apparent from the following description, and it will be understood that changes in the specific structure shown and described may be made within the scope of the claim and that any suitable materials may be used without departing from the spirit of the invention.

In the drawings forming a portion of this specification, and in which like characters of reference indicate similar parts in the several views, Figure 1 is a front perspective view of the device, Fig. 2 is a top view of one of the buckles, Fig. 3 is a detailed perspective view of one of the clamp members of the buckle, Fig. 4 is a similar view of the base member of one of the sliding clamps, Fig. 5 is an end view of one of the sliding clamps in operative position, Fig. 6 is a bottom view of the clamp member B', Fig. 7 is a similar view of one of the clamp members C'.

Referring to the drawings, there is shown a measure comprising a broad waist belt tape A marked with a linear scale and having secured to one end a clamp member B and having its opposite end engaged adjustably with the clamp as shown. The belt A carries a plurality of longitudinally slidable clamp members C, in which there are slidably engaged tapes 22, having affixed to their lower ends similar clamp members C' having slidably engaged therein a hip belt E, carrying a buckle B' similar to the buckle B. The sliding members C' have slidably engaged therein, tape members 23 carrying suitable weights G at their lower ends and extending upwardly a sufficient distance to reach above the waist belt A.

It will be seen that this measure may be readily engaged with the figure, the member A being properly adjusted to give the circumference of the waist, at the same time supporting the tapes 22 and belt E. By properly engaging the belt E with the figure, the measurement of the broadest point of the hips may be obtained and its distance from the waist determined, and thus the necessary length of the gore indicated on the tapes 22 slidably engaged with the clamps, carried by the belt E.

It will be noted that the clamps of the buckles B and B' are so adjusted that they point to the exact figures on the scales, indicating the circumference of the portion of the figure engaged by the respective belts. The smaller clamps C and C' are adapted to operate in a similar way. After the belt E has been adjusted, at the proper height the tapes 23 are then adjusted within the clamps C' to indicate the proper length of the skirt. The length of the tape 22, taken in conjunction with the diameters of the belts A and E indicate the length and necessary degree of curvature for the gore. It will be apparent that the measurements necessary may be quickly made with the present device, and the clamp members disposed at the necessary points adapt the measure to be secured in the exact position necessary so that the time of the person for whom the dress is to be made is not needlessly taken up, as the device may be detached from the figure and the measurements studied at leisure.

The efficiency of the device is dependent largely upon the peculiar construction of the buckles and clamps, the novelty of which, together with the desirable improvements in operation and simplicity of construction will be at once apparent from the illustrations. The buckles B and B' each comprise a base member 10, of approximately rectangular shape having at one end a transverse slot 11, having secured therein one end of the belt A or E. The blank is provided with a lateral downward projection 12 adjacent the slot 11, the extension 12 having its opposite edge portions 13 turned outwardly at right angles thereto and carrying revolubly therebetween a small shaft 14, supporting pivotally a clamp tongue 15. Spaced from the opposite end of the member 10 there are formed ears 16 carrying revolubly therebetween a shaft 17 having a clamp member 18 similar in form, but larger than that numbered 15.

It will be noted that the belt A is secured to the buckle B inwardly of the end of the tape a distance indicated by the scale on the belt equal to the distance between the outer end of the clamp member 18 when in engaged position, and the outer transverse edge of the slot. The clamp member 18 comprises a rectangular blank of sheet material longitudinally slitted at one end to provide a central engaging jaw 20 extending at right angles to the major portion of the blank, the remaining edge portions being turned to form knuckles 21 adapted to engage around the pivot shaft. The opposite portion of the blank thus forms an operating wing 19, the outer edge of which is adapted to serve as an indicator on the coengaged tape to indicate an exact circumference of any object around which the belt is engaged. The wing 19 is made more effective as an indicator by reason of the fact that figures beyond the point of measurement are hidden therebeneath. The member 15 is exactly similar in construction to the clamp 18 as indicated, the outer end of its operative wing being directed upwardly when in clamped position. Engaged slidably beneath the clamp 15 there is a portion of tape 22 having secured to its lower end a clamp member B′ similar to that indicated at B with the exception that on its upper edge opposite the extension 12, there is a short longitudinally extending slot 23′, in which the lower end of the tape 22 is secured.

The tape 22 is provided with scales and figures numbered consecutively upward and is engaged with the clamp B′ inwardly of its lower end a distance equal to the distance between the upper end of the clamp 15 and the upper edge of the member 10, so that the upper end of the clamp 15 will serve as a pointer to indicate exactly the distance from the upper end of the buckle B to the upper end of the buckle B′.

The clamp members C comprise rectangular strips of sheet material 25, provided with central ears 26 having registering openings therethrough carrying suitable shafts 27.

A strap 28 is stamped from the central portion of the blank extending longitudinally of the member 25 and adapted to receive slidably thereunder the belt A. Engaged upon the shaft 27, there is a clamp member 29 similar to the members 15 and 18, with the exception that the central pivot portion of the clamp is bent around the shaft, while the side portions are extended to form engaging tongues 30, as shown in Fig. 5. Engaged slidably in the clamp members C there are tapes 22 similar to the ones first described having secured to their lower ends clamps C′, similar in form to the clamps C with the exception that at their upper ends they are provided with transverse slots 32, in which the lower ends of the tapes 22 are secured. The engagement of the clamps C′ with the tape 22 is so made with relation to the figures on the tape that the clamp wings will serve as pointers to indicate the distance between the belts A and E in a manner similar to that described in the clamps B and B′.

Engaged slidably with the clamps C′ there are tapes 23, the figures on which run upwardly from their lower end, and have secured at their lower ends weights 35, the thickness of which is allowed for in the scale on the tape, so that the thickness of the weight is included in the measurement indicated by the upper ends of the wing of the clamp C′.

It should be stated that the present device is adapted for use as a "drafter" for the construction of dress patterns, after the measurements of a figure have been made.

What is claimed is:—

An article of the class described, including a scaled belt, and a buckle member carried thereby, said buckle member comprising a base portion having a vertical slot at one end receiving one end of the belt therethrough, and having a clamp member pivoted thereon, said clamp having an operating wing adapted to indicate the length of the belt when engaged with a figure, said base member having a pendent extension having lateral ears thereon carrying therebetween a clamp member similar to the one first described, a vertical tape slidably engaged beneath the last named clamp member, a second buckle, similar to the one first described, carried at the lower end of the tape, a hip belt carried by the buckle, and a second vertical tape slidably engaged with the buckle.

In testimony whereof I affix my signature, in presence of two witnesses.

MARGARET E. MORRISON.

Witnesses:
GEORGE Q. DURBIN,
A. D. BARROWS.